(12) United States Patent
Easley

(10) Patent No.: US 8,337,040 B1
(45) Date of Patent: Dec. 25, 2012

(54) LIGHT EMITTING ASSEMBLY

(76) Inventor: Matthew N. Easley, Moore, OK (US)

(*) Notice: Subject to any disclaimer, the term of this patent is extended or adjusted under 35 U.S.C. 154(b) by 505 days.

(21) Appl. No.: 12/700,924

(22) Filed: Feb. 5, 2010

(51) Int. Cl.
*B60Q 1/00* (2006.01)
*B60Q 1/26* (2006.01)
*F21L 13/00* (2006.01)

(52) U.S. Cl. ......... 362/192; 362/183; 362/190; 362/458

(58) Field of Classification Search ............. 362/101, 362/157–208, 253, 458
See application file for complete search history.

(56) References Cited

U.S. PATENT DOCUMENTS

| | | | |
|---|---|---|---|
| 5,340,662 A | 8/1994 | McCarter |
| 6,502,953 B2 | 1/2003 | Hajianpour |
| 6,655,812 B2 | 12/2003 | Parker et al. |
| D543,296 S | 5/2007 | Turron et al. |
| 7,244,038 B2 | 7/2007 | Fotherby |
| 2007/0153523 A1 | 7/2007 | Thornhill et al. |

*Primary Examiner* — Jason Moon Han

(57) ABSTRACT

A light emitting assembly for a housing with a perimeter wall and an open bottom side. A water buoyant material is attached to the perimeter wall. A light emitter is mounted to the housing. The light emitter emits a light when power is provided to the light emitter. At least one battery component is mounted to the housing. The at least one battery component is electrically coupled to the light emitter. The at least one battery component is exposed through the bottom side of the housing to allow water to enter the at least one battery component. The at least one battery generates electricity when water enters the bottom side of the housing. The housing is placed in water so that the water acts as an electrolyte for the at least one battery component to provide electricity to the light emitter.

6 Claims, 3 Drawing Sheets

LIGHT EMITTING ASSEMBLY

BACKGROUND OF THE DISCLOSURE

Field of the Disclosure

The disclosure relates to light emitting devices and more particularly pertains to a new light emitting device for a water activated light emitting device.

SUMMARY OF THE DISCLOSURE

An embodiment of the disclosure meets the needs presented above by generally comprising a housing with a perimeter wall having an upper edge and a lower edge. A bottom side of the housing is open. A water buoyant material is attached to the perimeter wall to retain the housing on a surface of a body of water. A light emitter is mounted to the housing. The light emitter emits a light when power is provided to the light emitter. At least one battery component is mounted to the housing. The at least one battery component is electrically coupled to the light emitter. The at least one battery component is exposed through the bottom side of the housing to allow water to enter the at least one battery component. The at least one battery generates electricity when water enters the bottom side of the housing. The housing is placed in water so that the water acts as an electrolyte for the at least one battery component to provide electricity to the light emitter.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
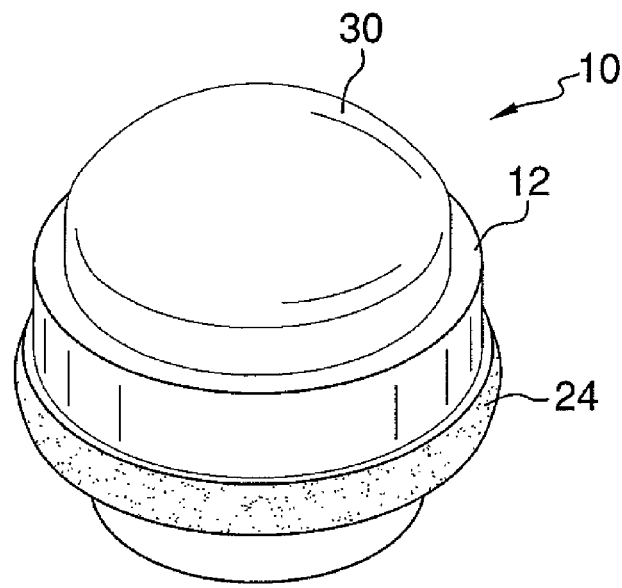
FIG. 1 is a top perspective view of a light emitting assembly according to an embodiment of the disclosure.
Figure 2:
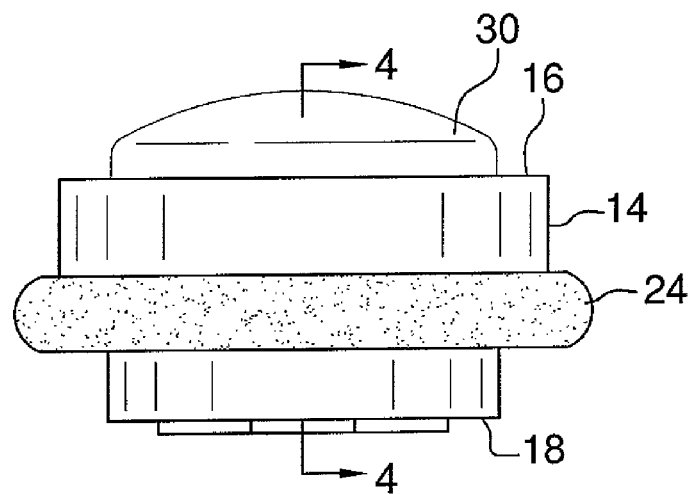
FIG. 2 is a side view of an embodiment of the disclosure.

With reference now to the drawings, and in particular to FIGS. 1 through 6 thereof, a new light emitting device embodying the principles and concepts of an embodiment of the disclosure and generally designated by the reference numeral 10 will be described.

As best illustrated in FIGS. 1 through 6, the light emitting assembly 10 generally comprises a housing 12 that includes a perimeter wall 14 having an upper edge 16 and a lower edge 18. A bottom side 20 of the housing 12 is open. This allows water 22, such as from a pool, pond or fountain to enter the housing 12 through the bottom side 20. A top wall 26 is attached to the perimeter wall 14.

A water buoyant material 24 is attached to the perimeter wall 14 to retain the housing 12 on a surface of a body of water 22. The water buoyant material may also, or instead, be incorporated into the perimeter wall 14 of the housing 12. The water buoyant material 24 may either comprise a foamed material or a hollow body which is attached to the housing and which is water proofed against leakage.

A light emitter 28 is mounted to the housing 12. The light emitter 28 emits a light when power is provided to the light emitter. The light emitter 28 may comprise a conventional light emitting diode. A covering 30 is attached to the housing 12 and covers the light emitter 28. The light emitter 28 may be mounted on the top wall 26 and a seal 32 may be positioned between the top wall 26 and the covering 30 to prevent water from contacting the light emitter 28.

At least one battery component 34 is mounted to the housing 12. The term battery component 34 is being used to indicate that at least one element is missing to qualify as a complete, electricity producing battery. The at least one battery component 34 is electrically coupled to the light emitter 28. The at least one battery component 34 is exposed through the bottom side 20 of the housing 12 to allow water 22 to enter the at least one battery component 34. The at least one battery component 34 forms a wet cell battery and generates electricity when water 22 enters the bottom side of the housing.

Figure 3:
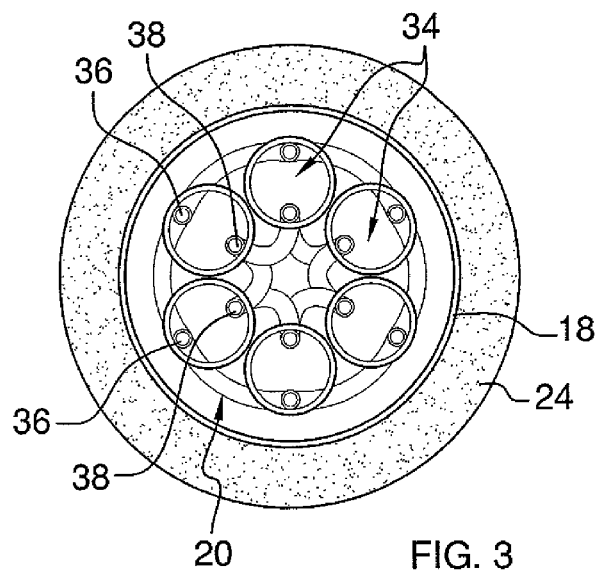
FIG. 3 is a bottom view of an embodiment of the disclosure.
Figure 4:
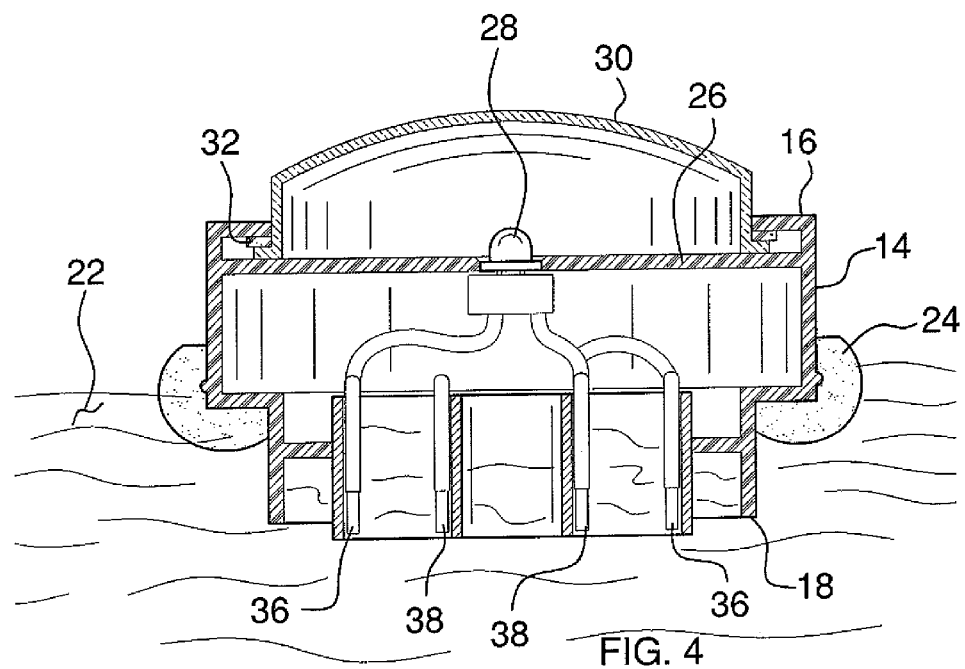
FIG. 4 is a cross-sectional view of an embodiment of the disclosure taken along line 4-4 of FIG. 2.
Figure 5:
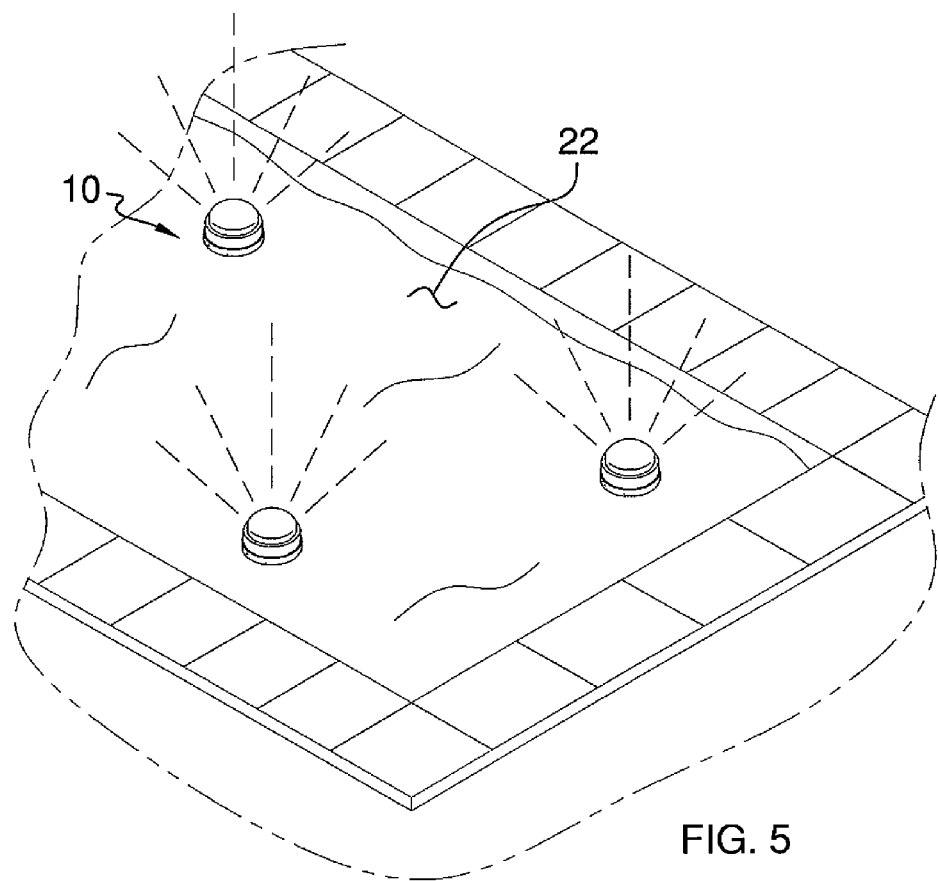
FIG. 5 is a top perspective in-use view of an embodiment of the disclosure.
Figure 6:
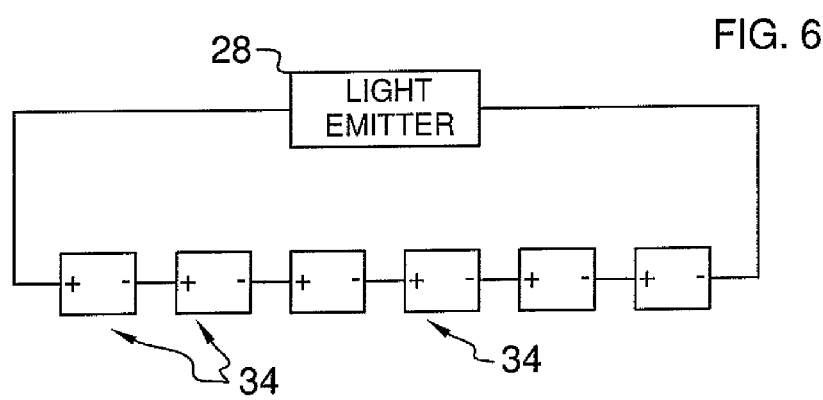
FIG. 6 is a schematic view of an embodiment of the disclosure.

The at least one battery component 34 includes a first plate 36 that is negatively charged and a second plate 38 that is positively charged. The first 36 and second 38 plates are placed in close proximity to each other, such as less than ½ inch. The first plate 36 is comprised of zinc while the second plate is comprised of graphite. Though the term "plate" is being used, the shapes of the first 36 and second 38 plates may be any readily available shape. As shown in FIG. 3, a plurality of battery components 34, electrically coupled together in series, may be utilized and in particular it has been found that approximately six battery components 34 are well suited to providing adequate electricity to fully illuminate the light emitter 28. The graphite and zinc plates each have a height from 1 inch to 3 inches and a width from about ½ inch to ¾ inch. It has been found that graphite plates of a medium harness (density) may be preferred over hard and soft graphite due to its ability to avoid corrosion of the battery component 34. On the English pencil grade scale, such graphite typically falls between a 3B rating and a 3H rating.

In use, the housing 12 is placed in water 22 so that the water 22 acts as an electrolyte for the at least one battery component 36 to provide electricity to the light emitter 28. This allows a person to simply place the housing 12 in a pool or other body of water to provide floating light sources and decorations without the need for adding a fully integrated wet or dry battery as a power source.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. A light assembly comprising:
   a housing including a perimeter wall having an upper edge and a lower edge, a bottom side of said housing being open;
   a water buoyant material of a foam or hollow body being attached to said perimeter wall to retain said housing on a surface of a body of water;
   a light emitter being mounted to said housing, said light emitter emitting a light when power is provided to said light emitter;
   at least one battery component being mounted to said housing, said at least one battery component being electrically coupled to said light emitter, said at least one battery component being exposed through said bottom side of said housing to allow water to enter said at least one battery component, said at least one battery generating electricity when water enters said bottom side of said housing; and
   wherein said housing is placed in water so that the water acts as an electrolyte for said at least one battery component to provide electricity to said light emitter.

2. The light assembly according to claim 1, said at least one battery component including:
   a first plate being negatively charged; and
   a second plate being positively charged.

3. The light assembly according to claim 2, wherein said first plate is comprised of zinc and said second plate is comprised of graphite.

4. The light assembly according to claim 1, further including a covering being attached to said housing and covering said light emitter.

5. The light assembly according to claim 2, wherein said at least one battery component includes at least six battery components electrically coupled together in a series.

6. A light assembly comprising:
   a housing including a perimeter wall having an upper edge and a lower edge, a bottom side of said housing being open, a top wall being attached to said perimeter wall;
   a water buoyant material being attached to said housing to retain said housing on a surface of a body of water;
   a light emitter being mounted to said housing, said light emitter emitting a light when power is provided to said light emitter, said light emitter comprising a light emitting diode;
   at least one battery component being mounted to said housing, said at least one battery component being electrically coupled to said light emitter, said at least one battery component being exposed through said bottom side of said housing to allow water to enter said at least one battery component, said at least one battery generating electricity when water enters said bottom side of said housing, said at least one battery component including;
   a first plate being negatively charged;
   a second plate being positively charged;
   said first plate being comprised of zinc, said second plate being comprised of graphite;
   said at least one battery component including six battery components electrically coupled together in a series;
   a covering being attached to said housing and covering said light emitter; and
   wherein said housing is placed in water so that the water acts as an electrolyte for said at least one battery component to provide electricity to said light emitter.

* * * * *